Sept. 3, 1957    E. D. MATTIX    2,804,939
HYDROCARBON SEPARATION
Filed Dec. 16, 1955
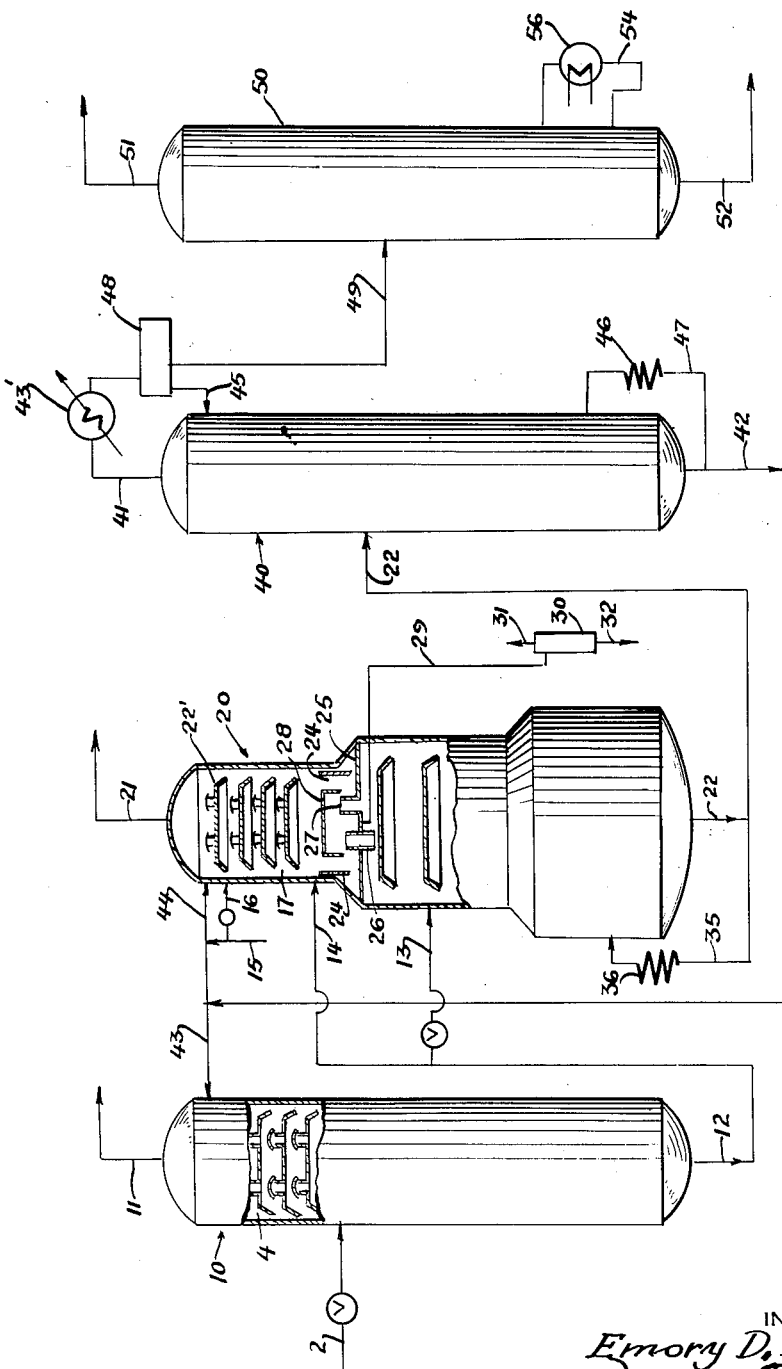
INVENTOR
Emory D. Mattix
BY
William S. Pelham
ATTORNEY

2,804,939
HYDROCARBON SEPARATION

Emory D. Mattix, Lake Charles, La., assignor to Cities Service Refining Corporation, Lake Charles, La., a corporation of Delaware Application December 16, 1955, Serial No. 553,650

8 Claims. (Cl. 183—114.6)

This invention relates to the separation and recovery of gaseous hydrocarbons, and more particularly relates to improvements in the operation of the deethanizer tower of a conventional light ends recovery unit.

The recent and continuing increase in consumer demand for gasolines of various boiling ranges has required refiners to increase the efficiency of the light ends separation and recovery units. In order to obtain maximum separation and recovery of the various components of a light ends hydrocarbon mixture, it is essential that all of the towers in a light ends recovery system operate at maximum efficiency to provide separation of the desired products.

It is generally recognized that inefficient operation of any of the columns in such a system will cause substantial reduction in product recovery. This is particularly so in the case of deethanizer columns where improper functioning may reduce overall separation and recovery of higher molecular weight components as much as 10 percent.

I have found that when treating gaseous hydrocarbon mixtures having nitrogen-containing materials present, deethanized operation is often particularly unsatisfactory. It has been my experience that nitrogen-containing hydrocarbon feed mixtures often cause severe plugging in the upper portion of the deethanizer column, resulting in flooding and disruption of the distillation equilibrium in the column. In addition, this unbalancing of the deethanizer column due to plug formation causes liquid carryover in the deethanizer overhead, and more importantly results in the presence of excess amounts of $C_2$ hydrocarbons in the deethanizer bottoms. The presence of excess $C_2$ in deethanizer bottoms means an increase in the separation load in the remaining columns of the system, and ultimately results in a lower yield of all products.

It is accordingly an object of my invention to increase deethanizer efficiency by removing, or preferably eliminating, the formation of plugs in the upper part of light ends deethanizer columns.

It is another object of my invention to reduce flooding in a deethanizer column, thereby preventing excess $C_2$ hydrocarbons from passing into the rich oil from which $C_3$ and higher hydrocarbons are recovered.

It is a further object of my invention to reduce liquid carryover in the deethanizer column overhead, and thus increase the amount of $C_2$ hydrocarbons separated in the deethanizer.

It is a still further object of my invention to increase the operational efficiency of a light ends absorption system by improving the operation of the deethanizer column.

Further objects and advantages of my invention will appear from the description which follows, taken in conjunction with the attached drawing, which is a schematic process flow of a light ends recovery unit.

Since the plugging or disruption of the deethanizer column is attributed to the presence of nitrogen-containing materials in the gaseous feed mixture, and in fact is probably more particularly due to the formation or presence of ammonia salts, it has been suggested that these materials be removed prior to introducing the feed mixture to the light ends recovery unit. While such a removal would be desirable and might avoid or minimize deethanizer plugging, no known economically suitable method is available for removing these compounds since they are present in very small amounts. Moreover, when mixed in a vaporous hydrocarbon feed, removal is extremely difficult.

My invention, on the other hand, provides a most effective and inexpensive means for removing and preventing the formation of ammonia salt plugs in a deethanizer column. According to my invention, the formation of ammonia salts in the deethanizer can be substantially reduced, and in fact prevented by introducing into the upper portion of the deethanizer a quantity of wash liquid or solvent, either in a continuous or intermittent manner. I have found that the use of a wash liquid in a continuous manner will prevent plug formation, whereas as intermittent wash at fixed intervals will eliminate plugs formed between treatments. The introduction of the wash liquid or solvent, which in most operations is preferably water, necessitates its removal from the deethanizer so as to prevent dilution and contamination of deethanizer bottoms. I have found that accumulation and withdrawal of the wash water at that point of the column at which the ammonia salts undergo sublimation offers a satisfactory and desirable place for the removal of wash water before decomposition of the ammonia salts.

The elimination of plugs in this manner permits increased throughput in the deethanizer column and ultimately increases separation and recovery of $C_3$, $C_4$, and higher hydrocarbons. Plug removal, on addition of wash liquid according to the method of my invention, reduces liquid carryover in the deethanizer overhead, prevents flooding and disruption of the distillation balance, and increases the amount of $C_2$ and $C_3$ hydrocarbons recovered.

Referring now to the schematic process flow diagram, numerals 10, 20, 40 and 50 represent the absorber, deethanizer, lean oil still, and depropanizer of a conventional light ends recovery unit operated on an absorption principle. For convenience, the depentanizer and the necessary rerun stills, heat exchangers, pumps, and associated equipment are not shown since these components of the normal recovery system do not form any part of my invention.

In the operation of a light ends recovery unit, a gaseous hydrocarbon mixture obtained from any one of a number of refinery cracking operations, either catalytic or thermal, is introduced into absorber column 10 by way of line 2.

The gaseous hydrocarbon mixture utilized as feed will have a varying composition depending on the source from which it is obtained. A feed mixture obtained from a conventional catalytic cracking operation will include methane, ethane, ethylene, propane, propylene, butane, butylene, iso-butylene, and other heavier saturated and unsaturated hydrocarbons. The light ends feed mixture will also include small amounts of carbon monoxide, carbon dioxide, and various nitrogen compounds including ammonia, hydrogen cyanide and such salts as ammonium carbonate, ammonium bicarbonate, and possibly some low molecular weight amine compounds.

In a light ends recovery unit of the type shown in the attached drawing, the vaporous feed mixture is introduced under pressure to absorber 10. Absorber 10 is a conventional absorption column, and includes a plurality of bubble decks or other contact means indicated by 4, which are constructed to provide substantially complete contact between the hydrocarbon feed mixture and the lean oil absorbent. The absorber is generally operated at pressures varying from atmospheric or slightly higher up to as high as 200 p. s. i., and a temperature upwards of about 100° F. The absorbing medium, generally referred to as the lean oil, is introduced into the absorber by lines 42 and 43, and is drawn from lean oil still 40 as hereinafter described. The lean oil generally comprises a mixture of $C_5$–$C_6$ hydrocarbons and will be adjusted in composition to insure maximum absorption of the $C_2$ and heavier hydrocarbons. The lean oil is introduced into the upper part of the absorber and permitted to flow downwardly in the absorber, stripping $C_2$ and heavier hydrocarbons from the vaporous feed mixture moving upwardly in the absorber.

After contact of the feed mixture and lean oil, the $C_2$ and higher hydrocarbons are withdrawn as bottoms in line 12. This bottoms product is generally referred to as the rich oil. The lighter components of the gas mixture, including methane, carbon dioxide, carbon monoxide, and other uncondensable gases are withdrawn by way of overhead line 11 and vented to the atmosphere or utilized as fuel, if desired.

Rich oil withdrawn in line 12 is introduced into the deethanizer 20 by way of lines 13 or 14, depending on the relative amounts of the various feed components in the rich oil. Deethanizer 20, similar to absorber 10, is provided with a plurality of bubble or contact trays indicated by numeral 17. The deethanizer is operated at a pressure of from 200 to 300 p. s. i., and at a considerable temperature differential between the upper and lower portions of the column. Generally, a temperature of from 70° to 90° F. is maintained in the upper portion of the column, with a temperature of from about 250° to 300° F. being maintained in the lower portion of the column. Control of the heat or temperature differential which is responsible for the removal of $C_2$'s from the rich oil is maintained by reboiler circuit 35, including heater 36. Reboiling is carried out on a portion of the deethanizer bottoms withdrawn in line 22.

It is in the deethanizer column that I have found it possible to make substantial improvements in operation. As previously indicated, difficulty has been encountered in operating a deethanizer column into which rich oil streams are introduced that contain ammonia salts. During the period of time in which these salts are maintained at a high temperature, no plugging problem occurs. It will be recalled, however, that the upper portion of deethanizer 20 operates at a considerably lower temperature than the bottom of the column so that separation of the $C_2$'s may be accomplished. At this lower temperature of from about 70° to 90° F., the ammonia salts sublime, forming in their solid state a coating in the upper part of the column. If not removed, these salts build up in amount and eventually disrupt the normal vapor-liquid balance in the column.

This unsatisfactory condition is overcome according to my invention by introducing controlled amounts of a wash liquid or ammonia salt solvent, preferably water or steam condensate, into the upper portion of the deethanizer. This wash liquid can be introduced by way of lines 15 and 16, directly or inadmixture with lean oil by way of line 44. Preferably, the wash liquid is introduced above the upper tray in the deethanizer such as is shown at 22'. The amount of wash liquid introduced will depend on whether treatment is to be carried out in an intermittent or continuous manner. I have found that if a continuous wash is conducted, 0.2 to 20 gallons per minute of water will be adequate. If an intermittent wash is utilized, the amount of liquid required will necessarily be somewhat greater and will depend on the time interval between the washes and the amount of solid deposit which has occurred between treatments.

Upon introduction, the wash liquid will contact the ammonia salts, dissolving the same, and thereafter move downwardly in the deethanizer, intermixing with the lean oil introduced at 44 and the upwardly-moving $C_2$ vapors which are withdrawn as overhead in line 21. Increase in temperature as the wash liquid moves down the column causes another sublimation of the ammonia salts at an intermediate point in the column. In a column having approximately 40 trays, this will occur in the vicinity of the 19th or 20th tray. Since it is necessary to remove the wash water from the column to prevent it being carried over in the bottoms in line 22, means are provided at an intermediate point in the column to accumulate and permit withdrawal of the collected wash water.

The accumulation means include conventional downcomers 24, which direct liquid overflow from tray 28 to accumulator tray 25. Accumulator 25 is provided with liquid downcomer 26 and vapor riser 27. Downcomer 26 permits flow of accumulated liquid, which includes rich oil and water, to the lower portion of the deethanizer, wherein further separation of $C_2$'s is accomplished. Rich oil is withdrawn as bottoms in line 22, and passed to the lean oil still. Wash liquid accumulated on tray 25 is withdrawn in line 29 and passed to settler 30. Hydrocarbon vapors carried over with the accumulated wash water are vented in line 31, with separated wash water being withdrawn from settler 30 in line 32 and passed to disposal. Liquid control means are provided in association with accumulator 25 to prevent excess accumulation of wash liquid and thereby prevent contamination of the rich oil.

Deethanizer bottoms, or the rich oil from which $C_2$ hydrocarbons have been removed, are then passed into lean oil still 40, wherein separation of the $C_3$ and higher hydrocarbons and the absorption medium is accomplished. Still 40 is generally maintained at a pressure of from about 40 p. s. i. to 100 p. s. i., and a temperature of from 200° to 450° F. Control of the separation in the lean oil still is accomplished by the amount of reflux returned to the column in line 45. Operation of the column provides an overhead which is withdrawn in line 41, passed through condenser 43', and into separator 48. A portion of the condensed overhead separated in 48 is recycled as reflux and returned to the column in line 45. A portion of the bottoms stream withdrawn in line 42 is passed by line 47 through heater 46 and used to maintain the heat balance necessary to provide proper distillation in the still. The remainder of the bottoms as lean oil passes by way of lines 42, 43 and 44 to the absorber and deethanizer respectively. That portion of the lean oil still overhead not utilized as reflux is withdraw from separator 48 in line 49 and introduced into depropanizer 50.

In depropanizer 50, separation of $C_4$ and $C_5$ hydrocarbons is accomplished. Heat control in column 50 is provided by reboiler circuit 54, which includes heater 56. An overhead comprising substantially all of the $C_4$ hydrocarbons orginally present in the hydrocarbon feed mixture is withdrawn in line 51. The $C_5$ hydrocarbons and heavier are withdrawn as bottoms product in line 52 and passed to further treatment or disposal, as desired.

While I have found the water wash of my invention to be particularly effective in elimination of deethanizer plugging, an effort should be made in associated treating processes to which the feed is subjected prior to cracking and light ends recovery to minimize the presence of ammonia or nitrogen containing contaminants as much as possible. Reduction in the amount of ammonia salt forming compounds in the feed by prior washing or other means will assist in minimizing the plugging problem.

The effectiveness of the water wash in removing such plugs will be evident from Table I which follows. Table I is based on analyses for ammonia made on water samples from the various sources indicated in the column headed "Source of Water." It will be noted that before water wash was conducted according to my invention, the percentage of ammonia in a deethanizer reboiler, the deethanizer 19th tray, and the lean oil still overhead separator drum amounted to 1.82 percent, 4.85 percent, and .24 percent respectively. After the installation of water wash according to my invention, ammonia content was reduced as shown in the "after" column by the amounts indicated.

TABLE I

*Ammonia content of water samples before and after reduction of ammonia*

| Source of Water | Before Wt. Percent $NH_3$ | After Wt. Percent $NH_3$ |
|---|---|---|
| Deethanizer Reboiler | 1.82 | .65 |
| Deethanizer 19th tray | 4.85 | .36 |
| Lean Oil Still Overhead Drum | .24 | 1.41[1] |

[1] The water to the lean oil still was reduced 90 percent.

The removal of the ammonia salts as accomplished by my invention has resulted in increases in overall product recovery. In particular, propylene recovery was increased from 96 volume percent to 98 volume percent. In addition, liquid carryover in the dry gas withdrawn from the deethanizer was substantially eliminated and an increase of percent of $C_2$ hydrocarbons was noted.

While I have shown and described a preferred form of embodiment of my invention, I am aware that variations may be made thereto, and I therefore desire a broad interpretation of my invention within the scope of the disclosure herein and the claims which follow.

I claim:

1. In a process for recovering hydrocarbons from a gaseous hydrocarbon mixture which includes ammonia salt compounds wherein the hydrocarbon mixture is introduced into an absorber and contacted therein with a lean oil, with methane and lighter components of the feed mixture being withdrawn as absorber overhead, and $C_2$ and higher hydrocarbons being withdrawn as a rich oil bottoms, and in which the rich oil bottoms is introduced into a deethanizer wherein $C_2$ hydrocarbons are withdrawn as overhead and $C_3$ and heavier hydrocarbons are withdrawn as bottoms and wherein the ammonia salt compounds are deposited in the upper portion of the deethanizer, thereby reducing the efficiency of said deethanizer, the improvement comprising introducing into the deethanizer above the top tray thereof a quantity of wash water sufficient to remove from the upper portion of said deethanizer the ammonia salts deposited therein by dissolving the same in the wash water, accumulating the wash water and the ammonia salt compounds contained therein at an intermediate portion of said column, withdrawing the accumulated wash water and ammonia salt compounds at a controlled rate from said column, separating hydrocarbons entrained in the withdrawn wash water, and passing the deethanizer bottoms to further separation.

2. In a process for recovering hydrocarbons as claimed in claim 1 wherein the wash water is introduced at a rate of between two-tenths of a gallon per minute and twenty gallons per minute.

3. In a process for recovering hydrocarbons from a gaseous hydrocarbon mixture which includes ammonia salt compounds wherein the hydrocarbon mixture is introduced into an absorber and contacted therein with a lean oil so as to remove from the feed mixture $C_2$ and higher hydrocarbons, and wherein methane and other uncondensable gases are withdrawn as overhead, and a rich oil containing substantially all the $C_2$ hydrocarbons of the original feed mixture is withdrawn as bottoms and introduced into an intermediate portion of a deethanizer column, with lean oil being introduced into the upper portion of said deethanizer column and in which a $C_2$ gaseous overhead is withdrawn and a $C_3$ liquid bottoms product is withdrawn and wherein deethanizer column efficiency is undesirably affected by the deposit of ammonia salt compounds in the upper portion thereof, the improvement comprising introducing above the top tray of said deethanizer a quantity of wash water sufficient to prevent the formation of ammonia salts from being deposited in the upper part of said column by dissolving the ammonia salt compounds therein, allowing the wash water to move downwardly in the column to a point at which ammonia salts contained therein sublime, accumulating the wash water at a point of sublimation, withdrawing accumulated wash water together with the ammonia salt compounds dissolved therein at a controlled rate from the deethanizer, and separating hydrocarbons entrained in said wash water.

4. In a process for recovering hydrocarbons as claimed in claim 3 wherein the wash water is introduced intermittently.

5. In a process for recovering hydrocarbons as claimed in claim 3 wherein the wash water is introduced in admixture with the lean oil introduced into the top of the deethanizer.

6. In a process for recovering hydrocarbons as claimed in claim 3 wherein the absorber bottoms is introduced into the deethanizer at a point below that at which accumulated wash water is withdrawn.

7. In a process for recovering hydrocarbons from a gaseous hydrocarbon mixture as claimed in claim 1, wherein the wash water is continuously introduced into the deethanizer.

8. In a process for recovering hydrocarbons from a gaseous hydrocarbon mixture as claimed in claim 1, wherein the wash water is introduced to the deethanizer intermittently.

References Cited in the file of this patent

UNITED STATES PATENTS

| | | |
|---|---|---|
| 2,164,593 | Rector | July 4, 1939 |
| 2,548,058 | Ragatz | Apr. 10, 1951 |
| 2,638,437 | Ragatz | May 12, 1953 |
| 2,661,812 | Gilmore | Dec. 8, 1953 |